United States Patent
Dang et al.

(10) Patent No.: US 11,886,537 B2
(45) Date of Patent: Jan. 30, 2024

(54) FAST PROBABILITY MEASURE MODULE FOR ENGINEERING SYSTEMS AND METHOD

(71) Applicant: KING ABDULLAH UNIVERSITY OF SCIENCE AND TECHNOLOGY, Thuwal (SA)

(72) Inventors: Shuping Dang, Thuwal (SA); Basem Shihada, Thuwal (SA); Mohamed-Slim Alouini, Thuwal (SA)

(73) Assignee: KING ABDULLAH UNIVERSITY OF SCIENCE AND TECHNOLOGY, Thuwal (SA)

( * ) Notice: Subject to any disclaimer, the term of this patent is extended or adjusted under 35 U.S.C. 154(b) by 0 days.

(21) Appl. No.: 17/670,601

(22) Filed: Feb. 14, 2022

(65) Prior Publication Data

US 2022/0261457 A1  Aug. 18, 2022

Related U.S. Application Data

(60) Provisional application No. 63/149,741, filed on Feb. 16, 2021.

(51) Int. Cl.
*G06F 17/18* (2006.01)
*G06F 11/34* (2006.01)

(52) U.S. Cl.
CPC .......... *G06F 17/18* (2013.01); *G06F 11/3452* (2013.01)

(58) Field of Classification Search
CPC .............................. G06F 17/18; G06F 11/3452
See application file for complete search history.

(56) References Cited

U.S. PATENT DOCUMENTS

2009/0248387 A1* 10/2009 Singhee ................ G06F 30/367
703/16
2012/0245906 A1* 9/2012 Kareem .................. G06F 17/18
703/2

FOREIGN PATENT DOCUMENTS

JP  2009146072 A  *  7/2009
JP  2014123272 A  *  7/2014

OTHER PUBLICATIONS

Machine translation for JP 2009146072 A, downloaded Jan. 2023 (Year: 2023).*

(Continued)

*Primary Examiner* — John C Kuan
(74) *Attorney, Agent, or Firm* — PATENT PORTFOLIO BUILDERS PLLC

(57) ABSTRACT

A method for estimating a status of a system includes performing independent measurements on the system, associating a value $P(\gamma)$ with a Monte Carlo calculated probability measure $\tilde{P}(\gamma)$, which depends on (1) a preset threshold $N_u$ of unfavorable events, and (2) a total number $\tilde{N}_{tot}(\gamma)$ of the independent measurements for collecting the preset threshold $N_u$, setting a threshold level $\eta$ requiring that a critical value $\gamma_c$ of a power related metric $\gamma$ makes a value $P(\gamma_c)$ of the probability measure P to be substantially equal to the threshold level $\eta$, comparing the total number $\tilde{N}_{tot}(\gamma)$ to a ratio of (1) a product of a control parameter $\epsilon$ the preset threshold $N_u$, and (2) the threshold level $\eta$, and interrupting the independent measurements if $\tilde{N}_{tot}(\gamma)$ is larger than the ratio, or increasing an output of the system if $\tilde{N}_{tot}(\gamma)$ is smaller than or equal to the ratio.

19 Claims, 14 Drawing Sheets

(56) References Cited

OTHER PUBLICATIONS

Shanmugam et al., "A Modified Monte-Carlo Simulation Technique for the Evaluation of Error Rate in Digital Communication Systems" 1980 IEEE (Year: 1980).*

Hsieh, M.-H., "Adaptive Monte Carlo Methods for Rare Event Simulations," Proceedings of the 2002 Winter Simulation Conference, San Diego, CA, USA, Dec. 8-11, 2002, vol. 1, pp. 108-115, IEEE.

* cited by examiner

301: Input: $\eta$, $\varepsilon$, $N_u$, and $\Theta$; Assign flag $\leftarrow 0$;
302: for $\gamma$ starting from $\min_\Theta \{\gamma\}$ to $\max_\Theta \{\gamma\}$ in order do
303:   Initialize the sampling settings for the current $\gamma$; Assign $n_u \leftarrow 0$; $\widetilde{N}_{tot}(\gamma) \leftarrow 0$, and $\widetilde{P}(\gamma) \leftarrow 0$;
304:   while $n_u < N_u$ do
305:     Carry out an independent trial for the current $\gamma$;
      if an unfavorable event is detected then
306:
307:       $n_u \leftarrow n_u + 1$;
308:     end if
309:     $\widetilde{N}_{tot}(\gamma) \leftarrow \widetilde{N}_{tot}(\gamma) + 1$;
310:     if $\widetilde{N}_{tot}(\gamma) > \varepsilon N_u/\eta$ then
311:       Assign flag $\leftarrow 1$; Break the while loop;
312:     end if
313:   end while
314:   if flag $== 0$ then
315:     $\widetilde{P}(\gamma) \leftarrow N_u/\widetilde{N}_{tot}(\gamma)$;
316:   else
317:     $\widetilde{P}(\gamma) \leftarrow n_u/\widetilde{N}_{tot}(\gamma)$; Record the current $\gamma$ associated with the break point of the while loop as $\gamma_b$; Break the for loop;
318:   end if
319: end for
320: if flag $== 0$ then
321:   Return a set of $\widetilde{P}(\gamma)$ for $\gamma$ in $\Theta$;
322: else
323:   Determine $\Theta_s$ as $\Theta_s = [\min_\Theta\{\gamma\},...,\gamma_b]$; Return a set of $\widetilde{P}(\gamma)$ for $\gamma$ in $\Theta_s$;
324: end if

FIG. 3

FAST PROBABILITY MEASURE MODULE FOR ENGINEERING SYSTEMS AND METHOD

CROSS-REFERENCE TO RELATED APPLICATIONS

This application claims priority to U.S. Provisional Patent Application No. 63/149,741, filed on Feb. 16, 2021, entitled "FAST PROBABILITY MEASURE SIMULATOR FOR COMMUNICATION SYSTEMS," the disclosure of which is incorporated herein by reference in its entirety.

BACKGROUND

Technical Field

Embodiments of the subject matter disclosed herein generally relate to estimating the status (e.g., outage or error) of an engineering system that exchanges information or power or goods among multiple parts of the system, and more particularly, to a method for determining the status associated with such an engineering system by using an interrupt mechanism for shortening the estimation time.

Discussion of the Background

Monte Carlo sampling has been widely applied in almost all science and engineering fields for numerical simulations and evaluations. In communications science, the Monte Carlo sampling method is commonly used to numerically estimating probability measures, e.g., outage probability and (bit/symbol/block) error probability [1]. The Monte Carlo sampling method is able to verify the correctness of analytical derivations and provide numerical insights into complex systems when mathematical analyses become intractable. Although the Monte Carlo sampling possesses a series of computing advantages, for example, the easy-to-implement, robust, and a priori knowledge free peculiarities, it inevitably demands a tremendous amount of time for processing enormous repeated random trials and approaching the statistical regularity in rare-event sampling by the law of large numbers. This is in particular the case for complicated application scenarios in the context of sixth generation (6G) communications, e.g., reconfigurable intelligent surface aided communication networks, space-air-ground integrated networks, and ultra-dense networks, and researchers are in dire need of a fast Monte Carlo sampling method.

Thus, there is a need for a new method that is capable of accelerating the Monte Carlo sampling for estimating the status of an engineering system.

BRIEF SUMMARY OF THE INVENTION

According to an embodiment, there is a method for estimating a status of a system and the method includes the steps of performing independent measurements on the system, associating a value $P(\gamma)$ of a probability measure P, when applied to a power related metric $\gamma$, with a Monte Carlo calculated probability measure $\tilde{P}(\gamma)$, which depends on (1) a preset threshold $N_u$ of unfavorable events extracted from the measurements, and (2) a total number $\tilde{N}_{tot}(\gamma)$ of the independent measurements for collecting the preset threshold $N_u$ of the unfavorable events, setting a threshold level $\eta$ uniquely associated with the system, requiring that a critical value $\gamma_c$ of the power related metric $\gamma$ makes a value $P(\gamma_c)$ of the probability measure P to be substantially equal to the threshold level $\eta$, comparing the total number $\tilde{N}_{tot}(\gamma)$ of independent measurements to a ratio of (1) the preset threshold $N_u$ of the unfavorable events, and (2) the threshold level $\eta$, where the ratio is multiplied by a control parameter E, and interrupting the independent measurements if the total number $\tilde{N}_{tot}(\gamma)$ is larger than the ratio, or increasing an output of the system if the total number $\tilde{N}_{tot}(\gamma)$ is smaller than or equal to the ratio.

According to another embodiment, there is a method for interrupting a Monte Carlo sampling while estimating a status of a system, and the method includes the steps of performing independent measurements of a power related metric $\gamma$ associated with the system, calculating a Monte Carlo probability measure $\tilde{P}(\gamma)$, which depends on (1) a preset threshold $N_u$ of unfavorable events extracted from the independent measurements, and (2) a total number $\tilde{N}_{tot}(\gamma)$ of the independent measurements for collecting the preset threshold $N_u$ of the unfavorable events, comparing the total number $\tilde{N}_{tot}(\gamma)$ of independent measurements to a ratio of (1) the preset threshold $N_u$ of the unfavorable events, and (2) a threshold level $\eta$, where the ratio is multiplied by a control parameter E, and interrupting the independent measurements if the total number $\tilde{N}_{tot}(\gamma)$ is larger than the ratio, or increasing an output of the system if the total number $\tilde{N}_{tot}(\gamma)$ is smaller than or equal to the ratio.

According to yet another embodiment, there is an estimation module for estimating a status of a system, and the estimation module includes an interface configured to receive a power related metric $\gamma$ to quantify a parameter of the system, and a processor connected to the interface. The processor is configured to perform independent measurements on the system, associate a value $P(\gamma)$ of a probability measure P, when applied to a power related metric $\gamma$, with a Monte Carlo calculated probability measure $\tilde{P}(\gamma)$, which depends on (1) a preset threshold $N_u$ of unfavorable events extracted from the measurements, and (2) a total number $\tilde{N}_{tot}(\gamma)$ of the independent measurements for collecting the preset threshold $N_u$ of the unfavorable events, receive a threshold level $\eta$ uniquely associated with the system, require that a critical value $\gamma_c$ of the power related metric $\gamma$ makes a value $P(\gamma_c)$ of the probability measure P to be substantially equal to the threshold level $\eta$, compare the total number $\tilde{N}_{tot}(\gamma)$ of independent measurements to a ratio of (1) the preset threshold $N_u$ of the unfavorable events, and (2) the threshold level $\eta$, where the ratio is multiplied by a control parameter $\varepsilon$, and interrupt the independent measurements if the total number $\tilde{N}_{tot}(\gamma)$ is larger than the ratio, or increasing an output of the system if the total number $\tilde{N}_{tot}(\gamma)$ is smaller than or equal to the ratio.

BRIEF DESCRIPTION OF THE DRAWINGS

For a more complete understanding of the present invention, reference is now made to the following descriptions taken in conjunction with the accompanying drawings, in which:

FIG. 3 illustrates a pseudocode of a Monte Carlo estimating method having an interrupt mechanism;

DETAILED DESCRIPTION OF THE INVENTION

Figure 1:
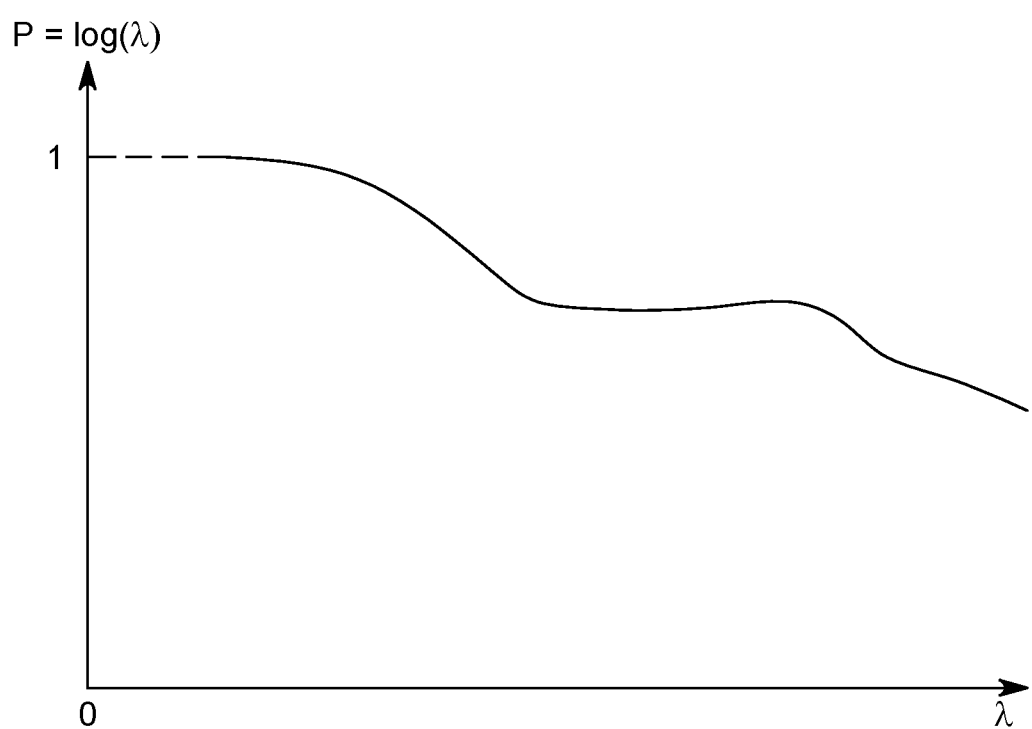
FIG. 1 schematically illustrates a decrease of a value of a probability measure as a function of a corresponding power related metric value increase.
Figure 2A:
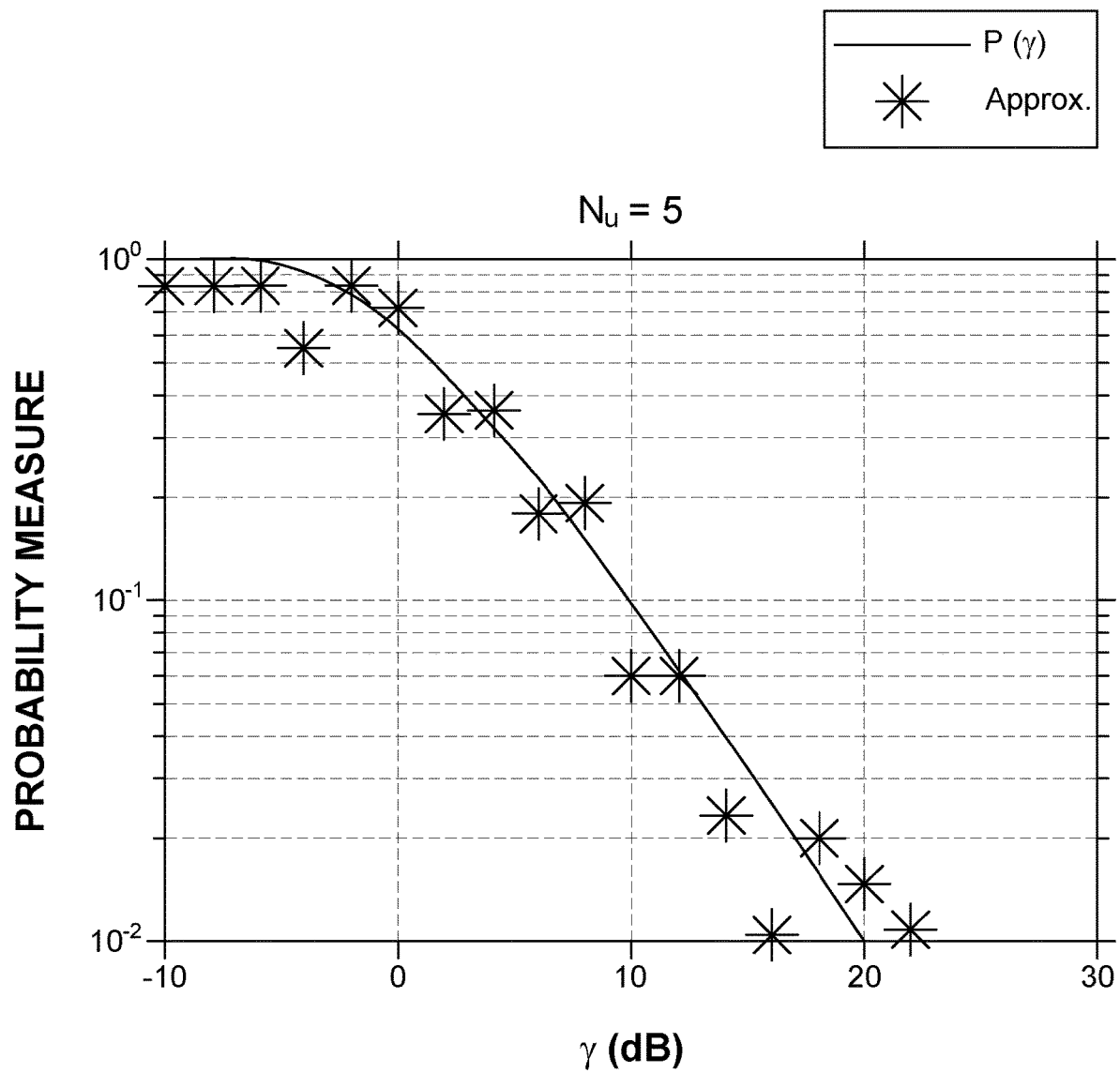
FIGS. 2A to 2D illustrate an example of a probability measure and its estimates generated by Monte Carlo sampling with different number of unfavorable events in the logarithmic scale with respect to the power related metric.
Figure 2B:
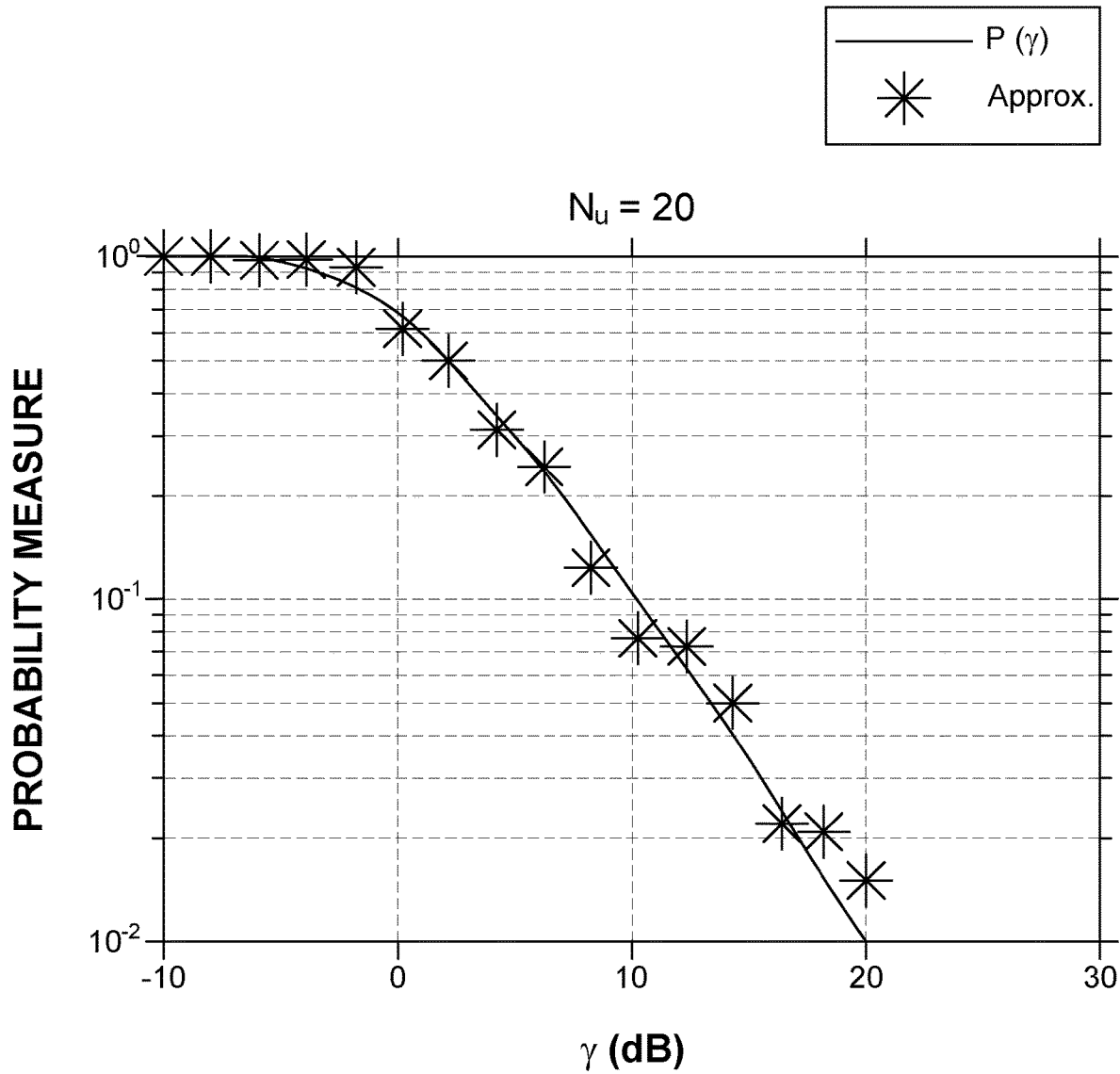
Figure 2C:
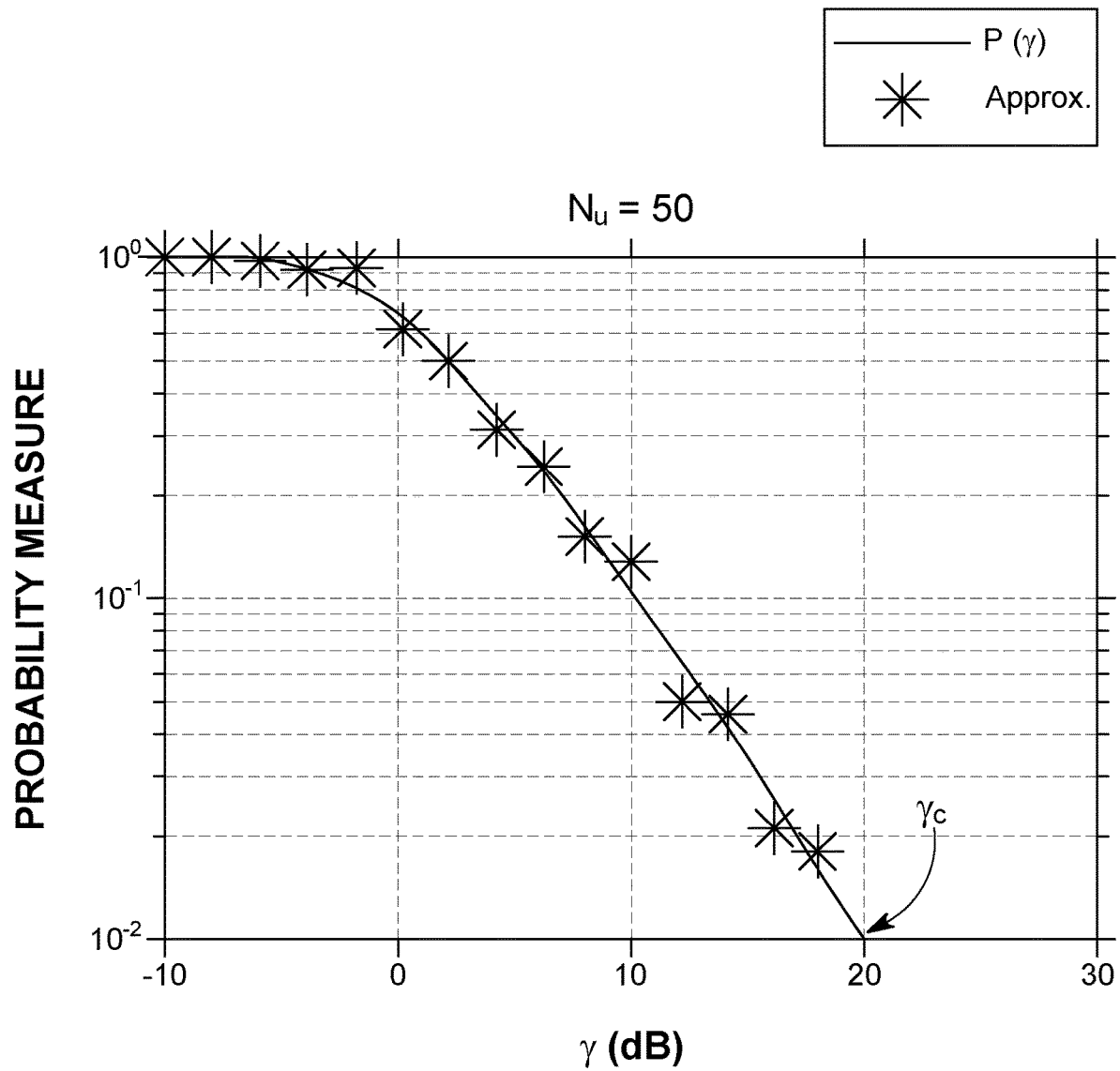
Figure 2D:
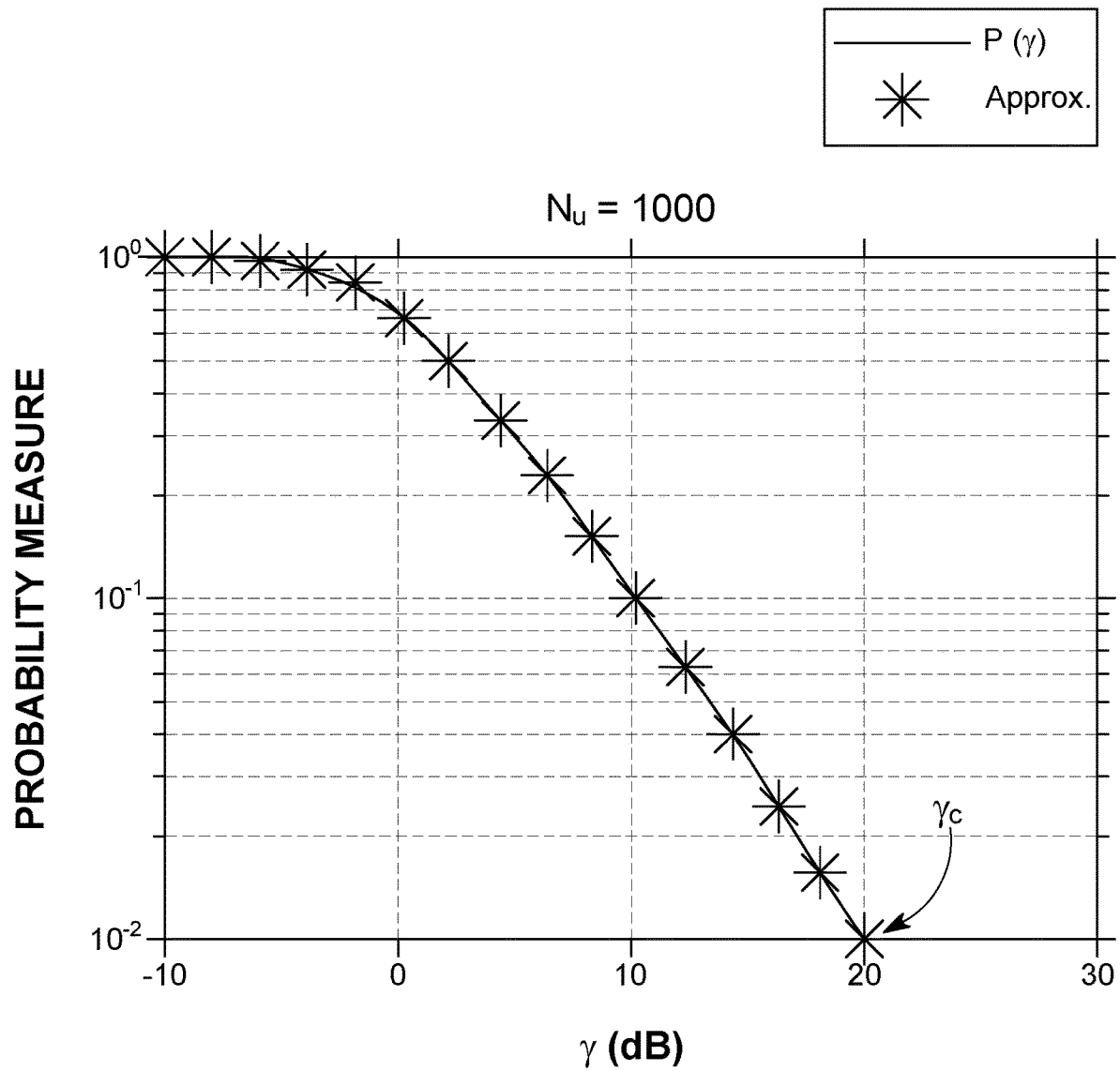

The following description of the embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to a telecommunication system. However, the embodiments to be discussed next are not limited to a telecommunication system, but may be applied to other complex engineering systems, for example, a power system, or a robotic system, or a factory, or a smart city, etc., which are generically called herein a distributed system.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

According to an embodiment, an interrupt mechanism is developed for a Monte Carlo sampling process of a large engineering/distributed system and interrupt mechanism is able to estimate whether the Monte Carlo process should be terminated earlier or not, based on a number of trials and determined unfavorable events. The interrupt mechanism does not rely on a prior knowledge that is expected to be known before carrying out the Monte Carlo sampling process, as in most cases the access to apriori knowledge would be difficult and even impossible. The interrupt mechanism only needs a posteriori knowledge that is collected during the operation of the Monte Carlo sampling process. In one implementation, the way of breaking the while-loop and the for-loop involved in the Monte Carlo sampling process is simplified and made easy-to-implement into an existing system. The novel probability measure simulator is dedicated to reducing the sampling rounds for the entire sampling procedure, but not to accelerate each round. Therefore, the proposed interrupt mechanism, which is implemented into a corresponding estimation module or a controller of the system, can also be applied in conjunction with and overlaid by widely applied Monte Carlo sampling enhancement approaches for expediting each round, e.g., importance sampling. Note that the interrupt mechanism may be implemented in software, hardware, or a combination of the two. The interrupt mechanism may be implemented into an existing engineering/distributed system or may be used as a design tool for designing a future engineering/distributed system.

Details of the estimation module are now discussed. Most probability measures P studied in communication science for characterizing rare events, e.g., outage and/or error, are monotone non-increasing and presented in the logarithmic convention in regard to an associated power related metric $\gamma$. The power related metric $\gamma$ is defined herein as a mathematical quantity that depends on an amount of energy or power used, received, consumed, or generated by a part of the system or by the system. For example, for a telecommunication system, the power related metric $\gamma$ may be one of a signal-to-interference-plus-noise ratio (SINR), signal-to-noise ratio (SNR), and signal-to-interference ratio (SIR). For example, the SNR power related metric evaluates a ratio between the electrical power of an electromagnetic signal received by a communication terminal (e.g., a tower or cell phone) and the power of the ambient electromagnetic noise. The result of this power related metric is a real number.

In this embodiment, these unique properties of the probability measure P in communications science are leveraged to construct an easy-to-implement interrupt mechanism to accelerate the Monte Carlo sampling for estimating probability measures. This embodiment assumes, for operational reasons, that the probability measure P has the following characteristics:

(1) measure P is a real-valued probability measure restricted within the interval [0,1], with a finite and binary support S. This means that the probability measure P can take any value between 0 and 1, and the binary support S means that the phenomenon described by the probability measure P can have only two outputs, e.g., outage or no outage, or error or no error;

(2) the probability measure P captures the statistical nature of a rare and unfavorable event (e.g., outage, error), and more specifically, evaluates the occurrence likelihood of such a random event; and (3) the probability measure P is monotone non-increasing with respect to a power related metric $\gamma$, and by convention, the measure P is presented as a logarithmic coordinate with a linear span of the power related metric $\gamma$, as schematically illustrated in FIG. 1.

The outage probability and the error probability in communications science are the representative examples of the probability measure P with the aforementioned characteristics. Without loss of generality, a symbolic probability measure is introduced herein as being $P(\gamma) = \mathbb{P}\{$unfavorable event occurs$\}$, with the support S={unfavorable event, favorable event}, where $\gamma$ represents a certain power related metric expressed in decibel (dB), for example, SINR, SIR, or SNR. In the following, it is assumed that the probability measure $P(\gamma)$ is estimated by $\hat{P}(\gamma)$, which is generated by the Monte Carlo sampling linearly with an equal step size spanning from the lowest power related metric $\gamma$'s value to the highest, of interest, and presented as a logarithmic coordinate.

In one implementation, $\hat{P}(\gamma)$ is generated by Monte Carlo sampling to estimate $P(\gamma)$ according to the following relation:

$$\tilde{P}(\gamma) = \frac{N_u}{\tilde{N}_{tot}(\gamma)}, \quad (1)$$

where $N_u$ is a preset threshold of the collection of unfavorable events, and $\tilde{N}_{tot}(\gamma)$ is the total number of repeated independent trials for collecting the $N_u$ unfavorable events. The quantity $\tilde{P}(\gamma)$ is called herein the Monte Carlo calculated probability measure or the estimated probability measure. The $N_u$ number is random but statistically associated with $\gamma$ in the sense that once the power related metric $\gamma$ is selected, the number of unfavorable events, although not determined by the power related metric, is related to that power related metric.

Based on this relationship, it is possible to repeatedly carry out a series of random and independent trials for a given engineering/distributed system, e.g., a telecommunication system, check whether the unfavorable events (e.g., outage) occur in each of these trials, and then terminate (earlier than the traditional method does) the Monte Carlo sampling process once $N_u$ unfavorable events have been observed. During this process, the simulation module in which this process is implemented counts the total number of conducted trials $\tilde{N}_{tot}(\gamma)$, when terminating the Monte Carlo sampling process. With both of these results, i.e., the $N_u$ and $\tilde{N}_{tot}(\gamma)$ results, the process is able to calculate $\tilde{P}(\gamma)$ based on equation (1), and thus, to estimate the probability measure $P(\gamma)$, which is equal to $\tilde{P}(\gamma)$ for a large number of trials. In other words, for large numbers and statistical independence among all repeated trials, it can be proven that $$\lim_{N_u \to \infty} \{\tilde{P}(\gamma)\} = P(\gamma).$$

An illustration of the probability measure P and its estimates generated by Monte Carlo simulation with different $N_u$ in the logarithmic scale with respect to the SNR power metric $\gamma$ is illustrated in FIGS. 2A to 2D. FIGS. 2A to 2D correspond to the outage probability over a normalized Rayleigh fading environment in a communication system. The numerical results presented in these figures indicate how the value of $N_u$ impacts the estimation accuracy of the probability measure P. note that the value of $N_u$ increases from plot to plot.

In communications science, researchers are normally interested in the outage/error performance of a system above a certain threshold level $\eta$, for example, $10^{-2}$. Such a threshold level is prescribed by telecommunications standards and protocols. As a result, the performance below such a threshold is not of interest for a telecommunication system, and might be omitted in the plots. As an example, FIGS. 2A to 2D do not show the probability measure values (on the Y axis) below this threshold although the power related metric $\gamma$ has been sampled up to 30 dB. Because of the setting of the threshold $\eta=10^{-2}$ in the figures, the probability measure P below this threshold is omitted. That is, the sampling over the sub-span between 20 dB and 30 dB is omitted. This means that it is possible to reduce the full span of the power related metric $\gamma$ so that the sampling is also reduced, i.e., the sampling process can be terminated at a value close to a critical power related metric, denoted herein as $\gamma_c$, which leads to $P(\gamma_c)=\eta$. However, because of the lack of apriori knowledge, when sampling over the full span of the values of the power related metric $\gamma$ with an equal step size, denoted as $\theta$, it is still not possible to know, a priori, the critical power related metric $\gamma_c$, above which the sampling process should be terminated.

In one application, it is possible to estimate $\gamma_c$, a posteriori, given $\eta$, based on the relationship $$\gamma_c \approx \gamma_b = \operatorname*{argmin}_{\gamma \in \Theta|\gamma > \gamma_c}\{|\gamma - \gamma_c|\} \in \Theta,$$

by the number of trials and the number of collected unfavorable events, which will converge to the authentic value in probability. Therefore, it is possible to stipulate an interrupt mechanism based on a robust estimation of $\gamma_c$. For example, when the number of conducted trials $\tilde{N}_{tot}(\gamma)$ is larger than $\varepsilon N_u/\eta$, i.e., $$\tilde{N}_{tot}(\gamma) > \frac{\varepsilon N_u}{\eta}, \quad (2)$$

where $\varepsilon \geq 1$ is a control parameter balancing the sampling accuracy and time taken to run the calculations, the Monte Carlo sampling should be terminated. The corresponding value of the power related metric $\gamma$ calculated at the termination point is considered to be $\gamma_c$. Therefore, according to this embodiment, the estimation module is configured to not sample the probability measure for the remaining span thereafter, which is equivalently to shrinking the possible values of the step $\theta$, from the set $$\left\{\min_\Theta\{\gamma\}, \ldots, \max_\Theta\{\gamma\}\right\}$$

to a sub-span $$\left\{\min_\Theta\{\gamma\}, \ldots, \gamma_b\right\}.$$

In this way, the overall sampling process can be accelerated as the span of the power related metric has been reduced.

Based on the above principle and the associated interrupt mechanism discussed above, it is possible to define a fast probability measure estimation for communication (or power or other) systems, which is of good generality and can, in principle, be applied on top of any software/hardware performance evaluation and measurement platforms of communication systems, e.g., MATLAB, Mathematica, and LabVIEW. Such a probability measure process is illustrated by pseudocodes in FIG. 3. Line 301 in FIG. 1 indicates the input values for this algorithm. The variable "flag" is used to determine when to interrupt the sampling process. In line 303, the various parameters and variables are initialized. In line 304, a "while" cycle is started. Each time an unfavorable event is detected, it is recorded in line 307. In line 309, each new trial is counted. Line 310 checks the numbers of trials versus the condition expressed by equation (2) discussed above. If this condition is found to be satisfied, then the "flag" value is changed from 0 to 1 in line 311, and the "while" loop is broken. If the value of flag is zero in line 314, then the value of the Monte Carlo calculated probability measure noted in equation (1) is calculated. However, if the value of flag is one, the current value of the power related metric $\gamma$ is recorded in step 317, as this will be the break point $\gamma_b$. Also, when the value of the flag is not zero, see line 322, the sub-set of the steps is determined in line 323 and the value of the Monte Carlo calculated probability measure is returned.

As shown by the pseudocode in FIG. 3, the sampling is only carried out over a meaningful subset of power related metric $\gamma$ instead of all of its span, and the calculations are terminated once the estimated probability measure $\tilde{P}(\gamma)$ is likely to be below the threshold $\eta$ with a certain level of confidence controlled by $\varepsilon$. In general, the performance of the Monte Carlo sampling process is characterized by (1) the estimation accuracy, i.e., measuring how close the numerical results are to the analytical results, and (2) the sampling time, i.e., measuring how long the sampling process takes. In this embodiment, a Kullback-Leibler divergence (also known as the relative entropy) is used as the estimation accuracy measure. The occurrence of a favorable or unfavorable event is essentially Bernoulli distributed, and thus, a distance measure between $P(\gamma)$ and $\tilde{P}(\gamma)$ can be explicitly written as $$KLD(\gamma) = \tilde{P}(\gamma)\log_2\left(\frac{\tilde{P}(\gamma)}{P(\gamma)}\right) + (1 - \tilde{P}(\gamma))\log_2\left(\frac{1 - \tilde{P}(\gamma)}{1 - P(\gamma)}\right).$$

To take the interrupt mechanism into consideration, the Kullback-Leibler divergence $KLD(\gamma)$ can be averaged over the effective sub-span $\theta_s$ of $\gamma$ to obtain $$\overline{KLD} = \mathop{\mathbb{E}}_{\gamma \in \Theta_s}\{KLD(\gamma)\} = \frac{1}{|\Theta_s|}\Sigma_{\gamma \in \Theta_s} KLD(\gamma).$$

Apart from the estimation accuracy, the sampling time Time($\gamma$) is another good indicator of the performance of the proposed method, which signifies the computational complexity in a practical context. In one experiment, the inventors have set up the sampling environment with the following specifications: Processor: Intel® Xeon® Gold 6130 CPU @ 2.10 GHz-2.10 GHz (two processors); installed memory (RAM): 128 GB; operating system: 64-bit Windows 10, and count the sampling time Time($\gamma$) by tic/toc function embedded on MATLAB R2018a.

To indicate the computing generality, the outage probability over a normalized Rayleigh fading environment has been adopted, with SNR $\gamma \in \{-10, -9, \ldots, 30\}$ (dB) and a threshold $\eta = 10^{-2}$ as a simple example for investigation purposes. For such a case, it can be mathematically derived that $\gamma_c = -(\log(1-\eta))^{-1} \approx 19.98$ dB for the normalized channel setup. The experimental results regarding the average Kullback-Leibler divergence and the sampling time are presented in FIGS. 4A and 4B, respectively. To reveal the statistical regularity, these experiments have been repeated for 104 times and the results have been averaged over all the runs.

Figure 4A:
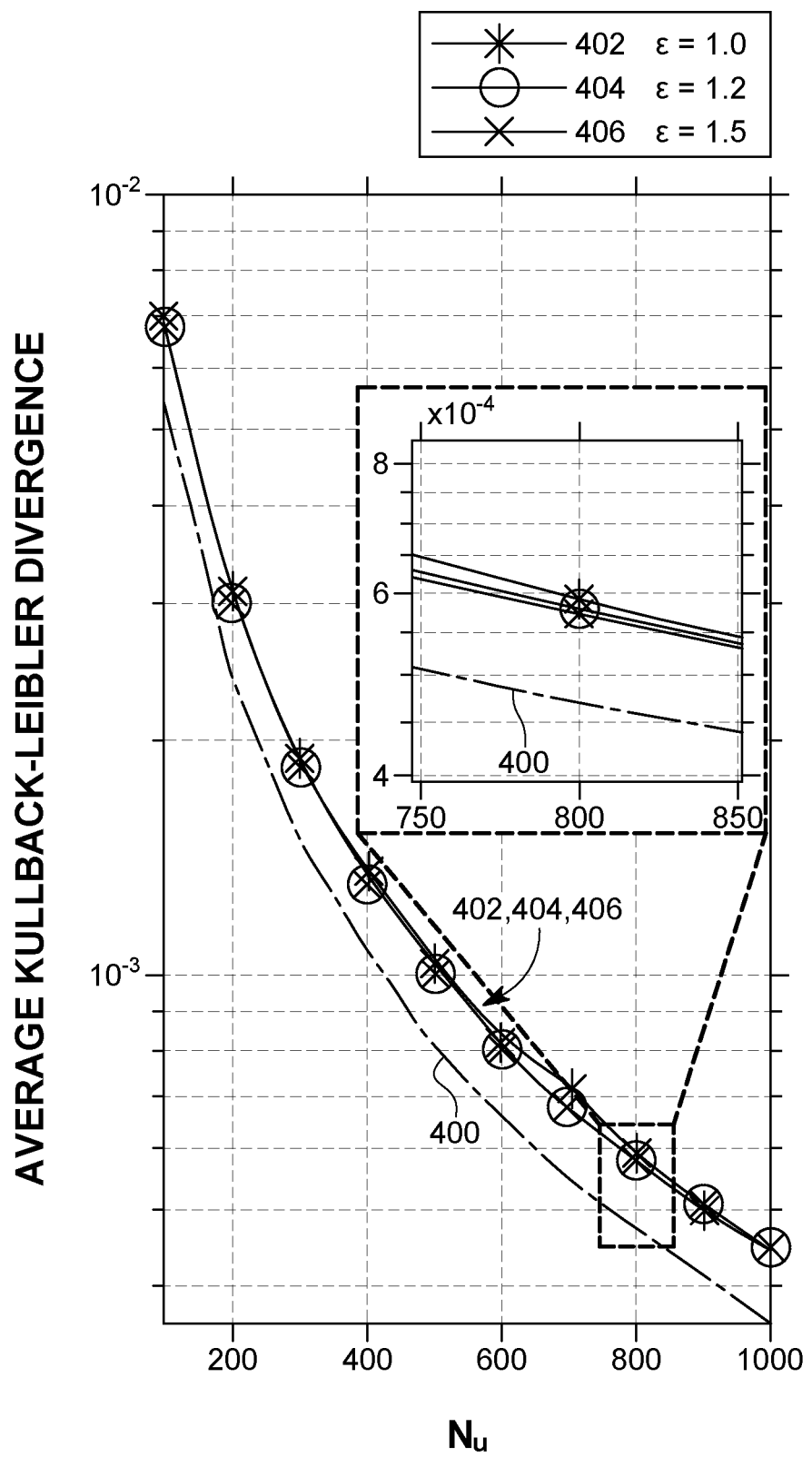
FIG. 4A shows experimental results of an average Kullback-Leibler divergence versus the number of outage events.
Figure 4B:
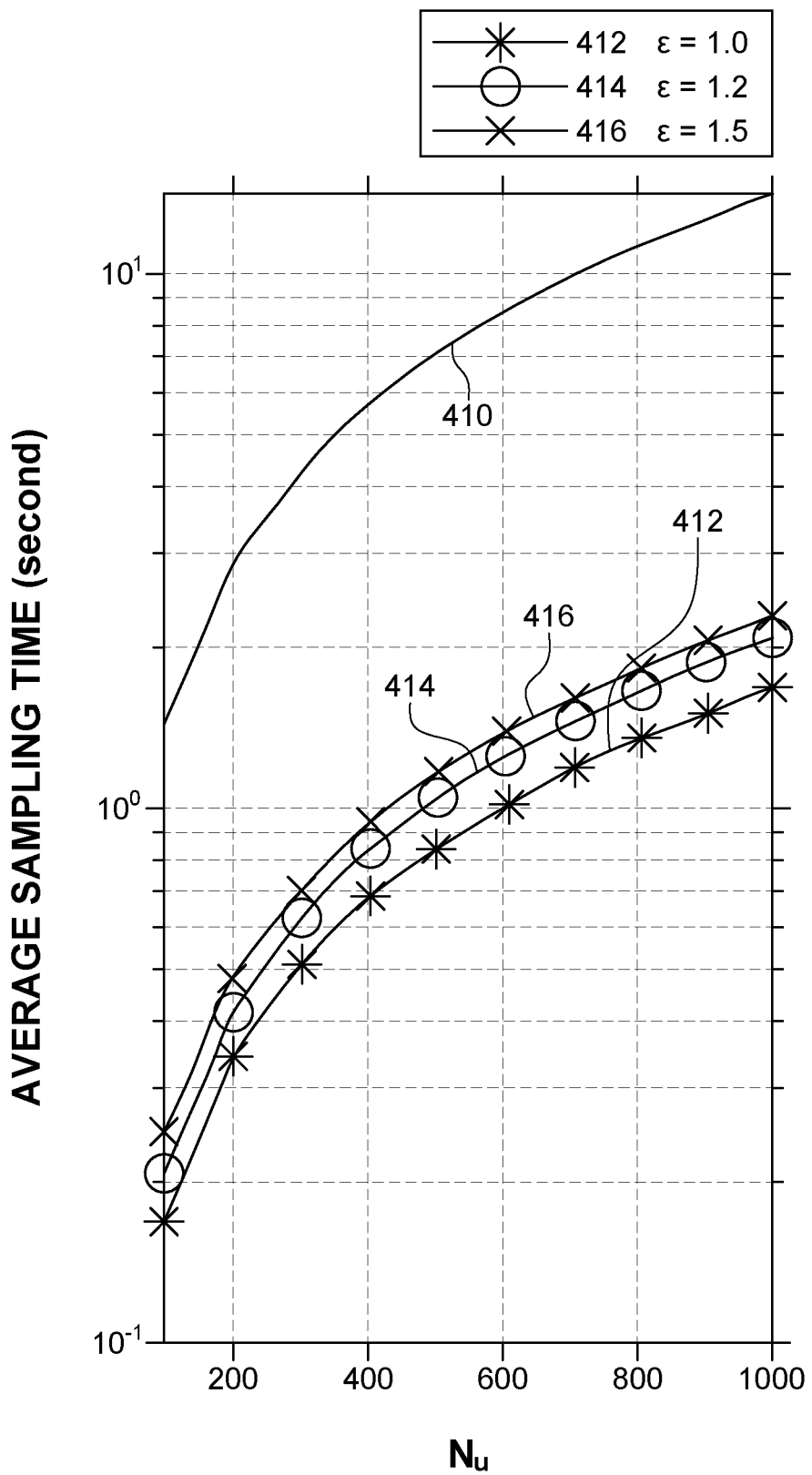
FIG. 4B shows experimental results of an average sampling time versus the number of outage events.

The naïve Monte Carlo sampling-based estimation 400 is taken as the comparison benchmark in the measurements illustrated in FIG. 4A. It is noted that the estimation accuracy loss caused by the interrupt mechanism is acceptable over the entire region of $N_u$ as all the estimation curves 402 to 406 (having different E values) are effectively on top of each other. In fact, the sampling procedures of the naïve Monte Carlo sampling based estimator and the proposed estimator are the same before reaching $\gamma_b$, and the difference is only caused by the incomplete sampling procedure for the remaining span after $\gamma_b$. On the other hand, as shown in FIG. 4B, with such an interrupt mechanism, the sampling times 412, 414, and 416 corresponding to the proposed estimator for various values of $\varepsilon$ have been significantly reduced when compared to the sampling time 410 of the naïve Monte Carlo, because the sampling procedure can be terminated earlier. Based on the above observations, the effectiveness and efficiency of the Monte Carlo sampling enhanced by the interrupt mechanism are validated.

One or more advantages associated with the discussed processing method include: (1) the interrupt mechanism is able to estimate whether the Monte Carlo sampling process should be terminated or not based on the numbers of experienced trials and collected unfavorable events; (2) the interrupt mechanism does not rely on apriori knowledge that is expected to be known before carrying out a Monte Carlo sampling process (in most cases the access to a priori knowledge would be difficult and even impossible), but only needs aposteriori knowledge that is collected during the operation of a Monte Carlo sampling process; (3) the ways of breaking the while-loop and the for-loop involved in the Monte Carlo sampling process are easy-to-implement in an existing system; and (4) the proposed method of probability measure estimation is dedicated to reduce the sampling rounds for the entire sampling procedure, but not to accelerate each round. Therefore, the proposed method can also be applied in conjunction with and overlaid by widely applied Monte Carlo sampling enhancement approaches for expediting each round, e.g., importance sampling.

Figure 5A:
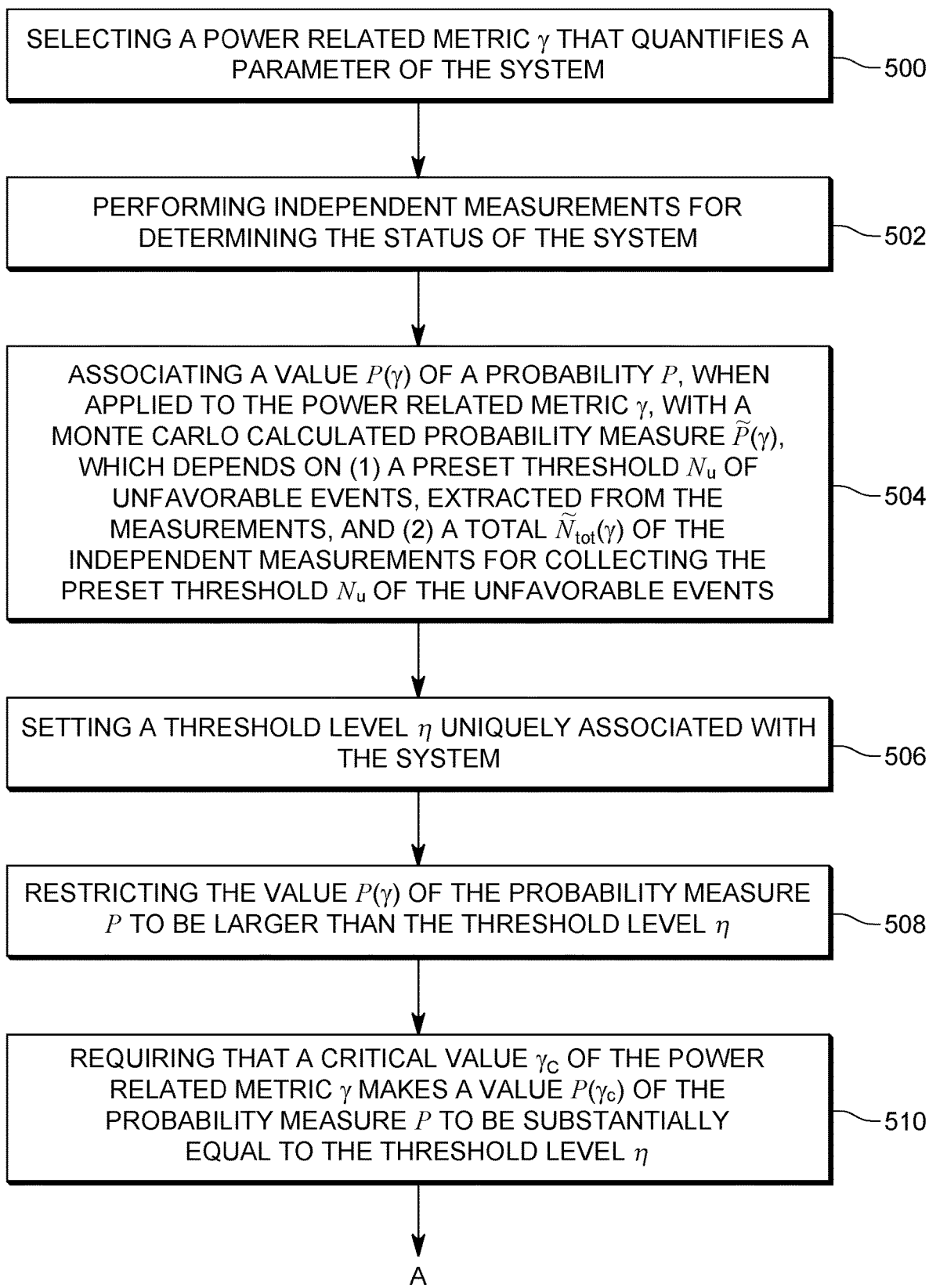
FIGS. 5A and 5B are a flow chart of the estimating method based on an interrupt mechanism based on Monte Carlo sampling.
Figure 5B:
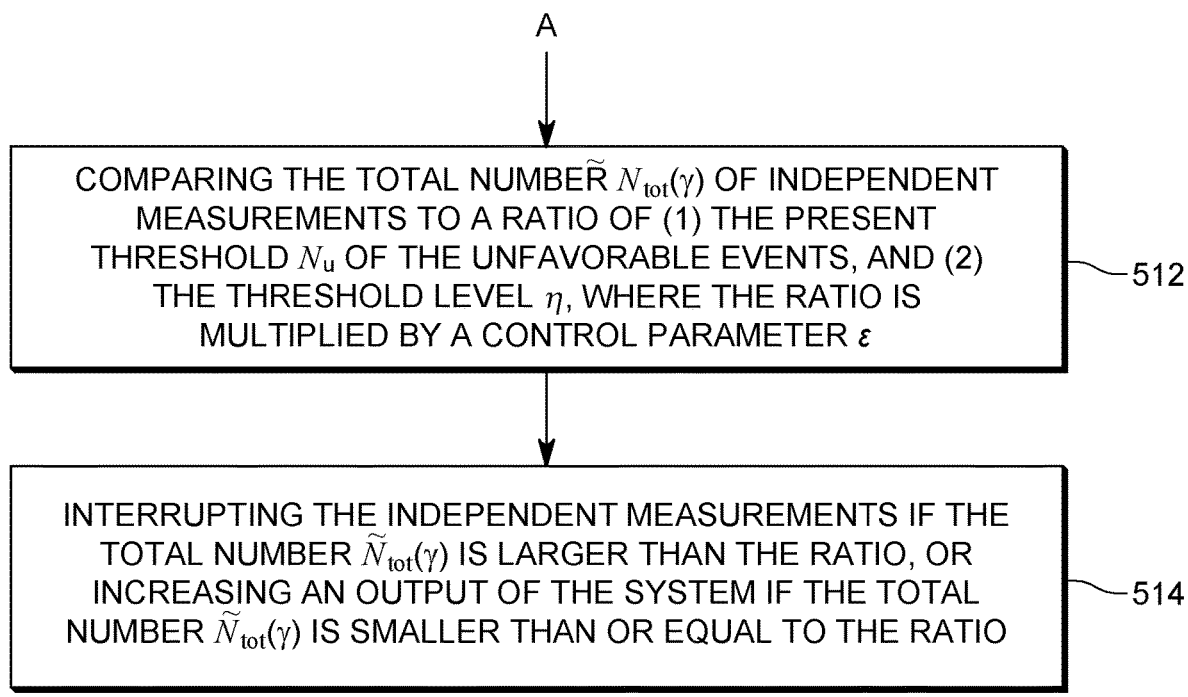

This process of estimating a status of an engineering/distributed system is now discussed with regard to FIGS. 5A and 5B. The method includes an optional step 500 of selecting a power related metric $\gamma$ that quantifies a parameter of the system, a step 502 of performing independent measurements for determining the status of the system, a step 504 of associating a value $P(\gamma)$ of a probability measure P, when applied to the power related metric $\gamma$, with a Monte Carlo calculated probability measure $\tilde{P}(\gamma)$, which depends on (1) a preset threshold $N_u$ of unfavorable events, extracted from the measurements, and (2) a total number $\tilde{N}_{tot}(\gamma)$ of the independent measurements for collecting the preset threshold $N_u$ of the unfavorable events. The method further includes a step 506 of setting a threshold level $\eta$ uniquely associated with the system, an optional step 508 of restricting the value $P(\gamma)$ of the probability measure P to be larger than the threshold level $\eta$, a step 510 of requiring that a critical value $\gamma_c$ of the power related metric $\gamma$ makes a value $P(\gamma_c)$ of the probability measure P to be substantially equal to the threshold level $\eta$; a step 512 of comparing the total number $\tilde{N}_{tot}(\gamma)$ of independent measurements to a ratio of (1) the preset threshold $N_u$ of the unfavorable events, and (2) the threshold level $\eta$, where the ratio is multiplied by a control parameter $\varepsilon$, and a step 514 of interrupting the independent measurements if the total number $\tilde{N}_{tot}(\gamma)$ is larger than the ratio, or increasing an output of the system if the total number $\tilde{N}_{tot}(\gamma)$ is smaller than or equal to the ratio.

In one application, the parameter is a signal transmitted by the system, the system is a telecommunication system, and the power related metric $\gamma$ is a signal to noise ratio. In this application or another application, the output is a power of a signal generated by a wave generator of the telecommunication system.

The method may further include a step of restricting the value $P(\gamma)$ of the probability measure P to be larger than the threshold level $\eta$. The Monte Carlo calculated probability measure $P(\gamma)$ is calculated using a Monte Carlo sampling method. In one application, which can be combined with any of the embodiments discussed above, the status of the system is an error or an outage of the system. The control parameter is equal to or larger than 1. The step of interrupting may include a step of avoiding sampling, with the Monte Carlo sampling method, a span of the power related metric $\gamma$, beyond the critical value $\gamma_c$.

The process of fast probability measure estimation discussed above has the potential to be generalized and applied to other probabilistic systems other than a communication system. That is, the probability measures P can also be understood in a broader way and regarded as a failure probability in general, which can be the probability in a power system that the generated power is less than the demand, the probability in a robotic system that certain vibrations of a robotic arm are larger than preset thresholds, and even the probability in a factory environment that prices of certain stored goods are higher/lower than preset thresholds. In such a generalized context, the power related metric $\gamma$ can also be changed to other metrics that are negatively correlated to the corresponding probability measure P, e.g., an amount of generated power, movement precision, and amount of a product in stock.

Figure 6:
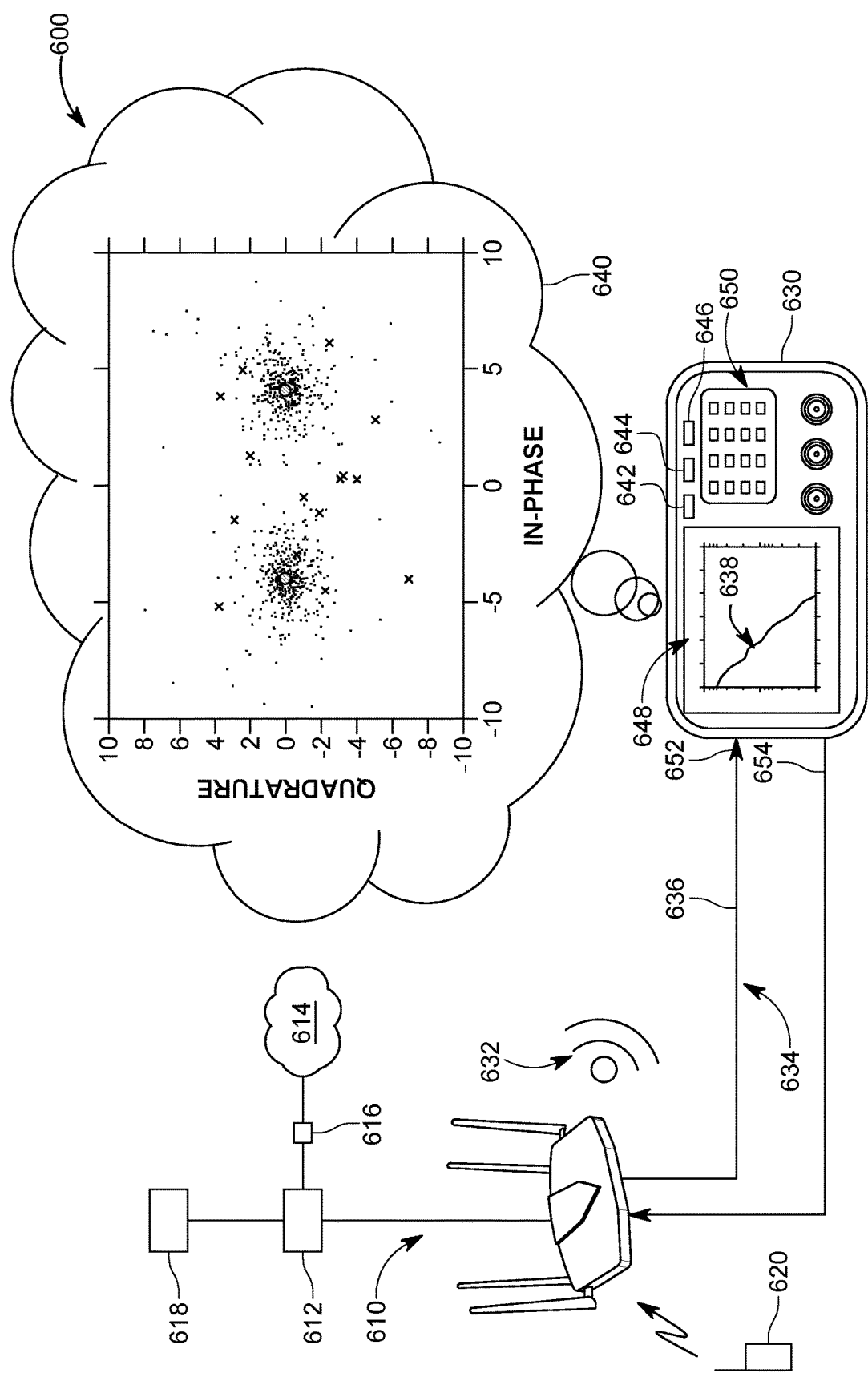
FIG. 6 illustrates one possible implementation of an estimation module that uses the estimating method of FIGS. 5A and 5B for determining a status of a telecommunication system.

To process of fast probability measure estimation is now illustrated with a couple of specific examples for indicating how to implement it into a practical application. The first application is a telecommunication system 600, which is illustrated in FIG. 6. The telecommunication system 600 includes at least one wave generator 610, for example, an RF radio generator, a cell tower, an antenna, a laptop, a smart-device, a controller, etc. The wave generator 610 is connected to similar devices for covering a given service area. For simplicity, only one wave generator 610 is shown in the figure. Each wave generator 610 may be associated with a corresponding service area, called a cell. The wave generators are connected to corresponding mobile switching centers 612, which in turn are connected to a public telephone network 614, which is a wired network. Various other modules may be present, like a gateway 616, or a server 618, as these elements are known in the art. A wireless mobile user 620 is configured to wirelessly connect to the wave generator 610. Information between the mobile user, the server, and/or other sites behind the public telephone network 614 may be exchanged according to existing protocols.

A performance estimator module 630 is shown in the figure being in wireless connection with the wave generator 610. The wave generator 610 sends a wireless signal 632 (e.g., a binary symbol through a wireless channel having a transmit power P) to the performance estimator module 630 and also a wired signal 634, along a wired connection 636, providing the binary symbol transmitted along the wireless signal 632. In this way, the performance estimator module 630 can detect whether information extracted from the wireless signal 632 has any errors, by comparing it to the information received from the wired signal 634. The detection error process 640 takes place into a processor 642 associated with the module 630.

In one application, the wired channel 636 is a parallel, independent, and reliable channel, for example, a wire-based channel connecting both the wave generator 610 and the performance module 630 by copper wire or fiber, in which the detection error rarely happens and is negligible. Then, the performance module 630 decodes the received signal and compares the decoded information with the baseline information received from the reliable channel to see if a detection error has happened. This process happens for a number of times $\tilde{N}_{tot}(\gamma)$ and each time an error is detected, it is recorded as $N_u$. A power related metric $\gamma$ needs to be selected for this process, for example, the SNR. Other metrics may be used. Based on a number of repeated trials, the performance module 630 calculates the error probability $\tilde{P}(\gamma)$ using the Monte Carlo method, under a current transmit power setup. The error probability 638 is schematically shown in FIG. 6 as depending on the transmit power of the wave generator 610. It is noted that as the transmit power is increased, the error probability decreases. Thus, the module 630 can calculate what transmit power needed to be used by the wave generator 610 to have a number of errors smaller than a given threshold $\eta$, e.g., $10^{-2}$.

Then, according to the designed interrupt mechanism discussed above (i.e., calculating when the $\tilde{N}_{tot}(\gamma)$ is larger than $$\frac{\varepsilon N_u}{\eta}\bigg),$$

the performance module 630 evaluates whether the current error probability is below the threshold of interest or not. If the answer is yes, then the module 630 instructs a processor of the system to terminate the signal transmission from the wave generator 610 to save time. However, if the answer is no, the module 630 requests the wave generator 610 to increase its transmit power by an increment until the estimated error probability is below the threshold of interest. Note that the estimator 630 may be a standalone device or implemented as part of the communication system 600. If a standalone module, the estimator 630 may have its own power source 644, for example, a battery, a memory 646, a screen 648, and an input/output interface 650 for inputting instructions from outside (for example, selecting which power related metric to use). In one application, the interface 650 may be a keyboard, or a microphone, or any other means that allows a user to enter commands. The memory 646 may store plural power related metrics so that the user can select which metric to use, depending on the application. In this embodiment, because the measured system is a telecommunication system, the user may select via the interface 650 the SNR metric. The estimator module 630 may also have ports 652, 654 (e.g., USB, HDMI, etc.) for connecting to various wires.

The estimator module 630 may be implemented in an existing communication network, for example, computer network or telecommunication network or any other network for determining what power each wave generator needs to generate to comply with industry standards for error or outage events. The module 630 may also be used when a communication network is configured or designed, before being implemented in the real world. In this way, the transmit power of each wave generator in the network may be evaluated and configured to ensure that the error and/or outage standards are fulfilled.

Figure 7:
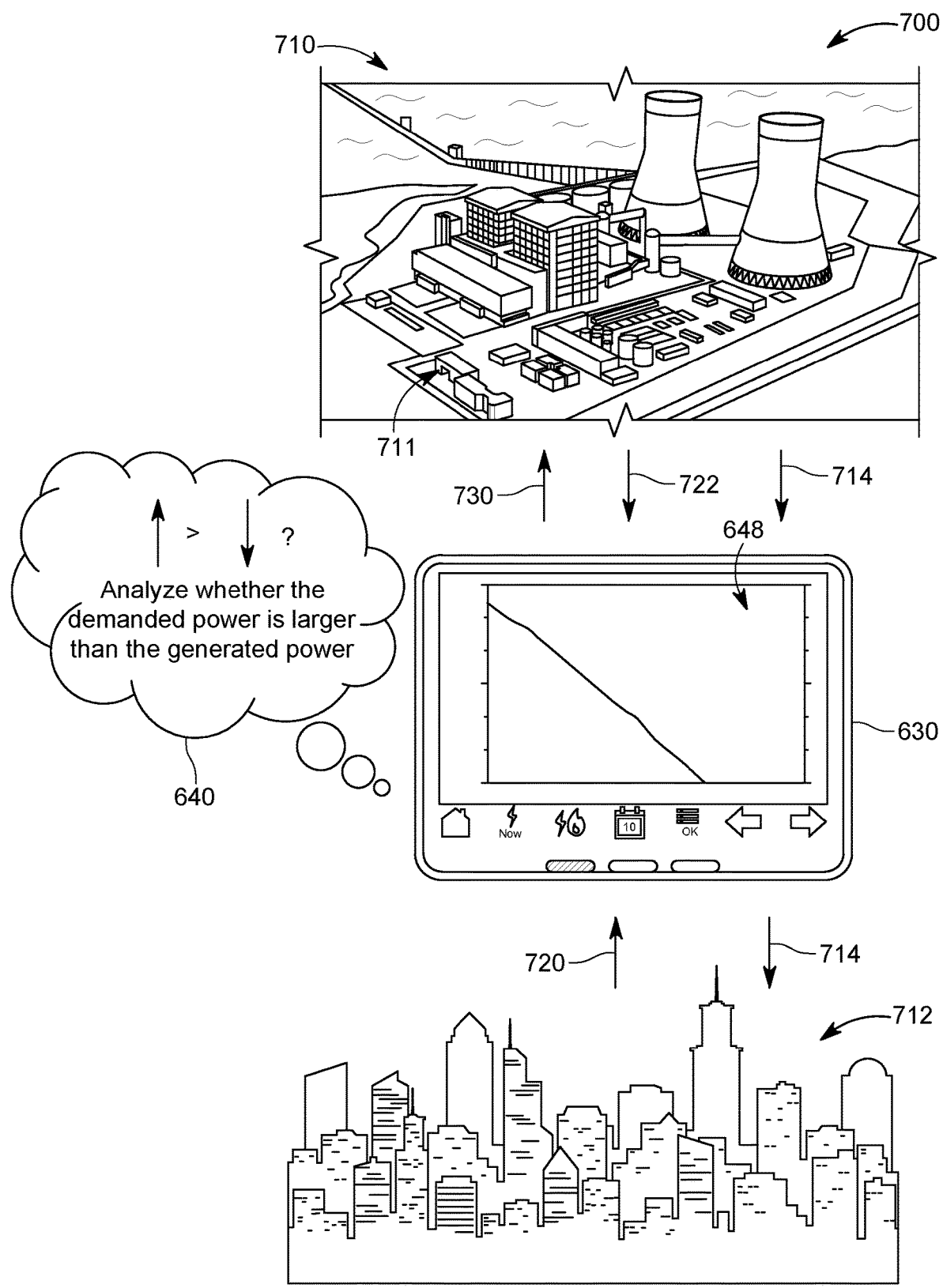
FIG. 7 illustrates another possible implementation of the estimation module that uses the estimating method of FIGS. 5A and 5B for determining a status of a power system.

In another embodiment, as illustrated in FIG. 7, instead of estimating the error transmissions in a communication system, a power system 700 is analyzed. The power system 700 includes one or more power plants 710 that generate electrical power, i.e., the supply side, one or more loads 712 that consume the power (industrial and/or residential users), i.e., the demand side, and a power transmission or grid 714 that carry the power from the supply side to the demand side. It is known that the amount of power used by the users fluctuates in time and there is almost impossible to predict how much power will be used in the next hour. Thus, the power plants 710 have the challenge to continuously adjust the power generation to match the power demand. If too much power is produced it goes to waste and if to little power is produced, the system may fail.

The estimator module 630 may be now used to determine the power outage probability for such a system based on the process exemplified in FIGS. 5A and 5B. The estimator module 630 has access to the demanded power signal 720 from the demand side and also from the generated power signal 722 from the supply side. Note that the signals 720 and 722 may be transmitted along the power grid 714, or along a separate communication network, wired or wireless. The estimator module 630 is then able to repeatedly check whether the demanded power is higher than the generated power (if this is the case, a power outage event is said to occur and it is recorded accordingly), given the current amount of generated power and therefore estimate the power outage probability. According to the designed interrupt mechanism, the estimator module is able to evaluate during a processing step 640, similar to that discussed above with regard to the communication system, whether the current power outage probability is below the threshold of interest or not. Note that the processing step 640 is exemplified in FIGS. 5A and 5B and associated description. If the power outage probability, which is illustrated on the screen 648 and plotted on the Y axis, is below the threshold, then the estimator module 630 terminates the measurement to save time. However, if the power outage probability is not below the threshold, the module 630 requests the control center 711 of the power station 710, through a command 730, to increase its generated power by an increment, until the estimated power outage probability is below the threshold of interest.

Figure 8:
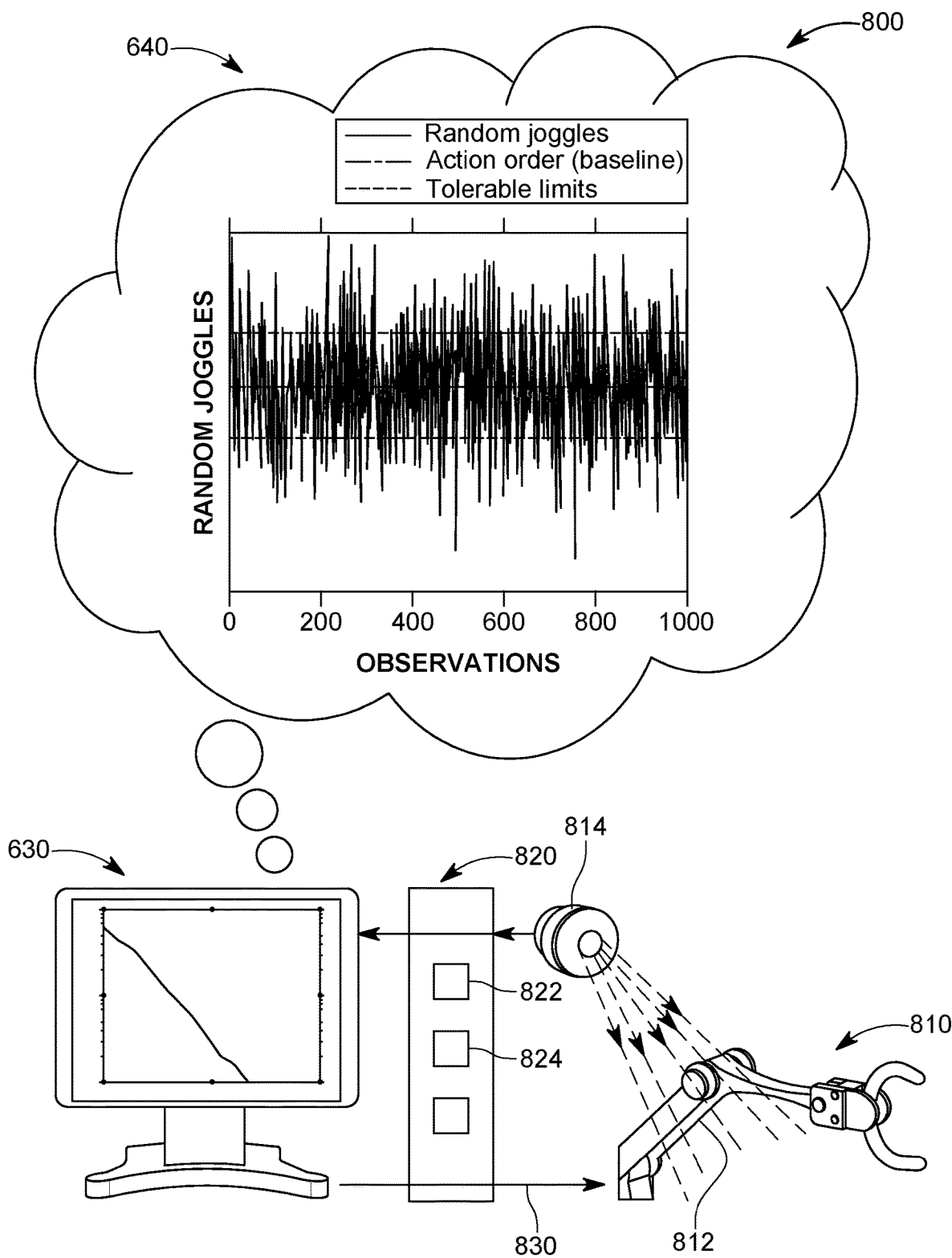
FIG. 8 illustrates yet another possible implementation of the estimation module that uses the estimating method of FIGS. 5A and 5B for determining a status of a robotic system.

Another possible implementation of the estimator module 630 is now discussed with regard to FIG. 8. FIG. 8 shows a robotic system 800 that includes a robot 810 having, for example, a mechanical arm 812 that is trained to grab an object at a first location and move it to a second location. The system 800 also includes a movement detector 814 that monitors the movement of the mechanical arm 812 and reports this movement to a control center 820. The control center 820 includes a processor 822 that performs various calculations and a memory 824 that stores the tasks to be performed by the arm 812. The processor 822, based on the input from the movement detector 814 and the instructions stored in the memory 824, calculates the new position of the arm 812, and instructs the arm to move to that new position.

As shown in FIG. 8, the estimate module 630 may be implemented as a standalone device and be connected to the control center 820. The estimate module 630 is shown in FIGS. 6-8 as being implemented as different devices to indicate that the process of FIGS. 5A and 5B, which is behind the logic of this module, can be implemented in various hardware platforms, as long as there are computational power and storage capabilities. The estimate module 630 estimates in this implementation the probability that random vibrations of the arm 812 exceed a given threshold, required by the smooth functioning of the robot 810. Based on the information provided by the motion sensor 814, the estimate module calculates during processing 640 for what control precision the vibration motions do not exceed a given limit or threshold. For this processing, the estimate module 630 may be configured to send an action order (baseline, the ideal movement) with a specified control precision (a high control precision will render in higher latency and computational complexity) to the robot 810. Then, the mechanical arm 812 of the robot 810 moves accordingly, while there is always a random vibration of the movement that deviates from the baseline. Such a random vibration is detected by the movement sensor 814. This data is used for applying the Monte Carlo estimation discussed above. In one implementation, the module 630 starts from a low control precision, by collecting the vibrations from repeated trials, and thus the module 630 is able to estimate the probability that the vibration exceeds the tolerable limits. Similar to the embodiments illustrated in FIGS. 6 and 7, according to the designed interrupt mechanism that is implemented in the module 630, the module 630 evaluates whether the current deviation probability is below the threshold of interest or not. If the answer is yes, then the module 630 instructs the controller 820 to terminate the measurements to save time. If the answer is no, the module 630 requests the controller 820 through a signal 830 to increases the control precision by an increment until the estimated deviation probability is below the threshold of interest.

While the examples discussed with regard to FIGS. 6-8 are illustrative, there are many other possible implementations of the module 630. For example, the module 630 may be implemented in a factory, which traditionally offers a given amount of products to the demand side, normally a sales department. According to the price fluctuation theory, the actual price of the products is dominated by the amount of supplied products, but this price is also affected by a large number of uncountable and random factors. Therefore, the actual price of the product may be treated as being a random number. The supply side can start to supply products at a lower amount, and the module 630 will then repeatedly detect the price fluctuations to estimate the probability that the actual price is higher than an upper limit. Similar to the above discussed embodiments, based on the implementation of the interrupt mechanism, the module 630 will also be able to evaluate whether the current deviation probability is below the threshold of interest or not. If yes, then the module terminates the measurement to save time, and if not, the module instructs the management of the factory to increases the supply amount by an increment until the estimated probability is below the threshold of interest.

Thus, the interrupt mechanism implemented to the Monte Carlo estimation module 630 is capable to enable a much faster simulation, evaluation, and verification of the probability measure for various systems. The module 630 can be retroactively implemented in any hardware and/or software platform for an engineer system that can be characterized by a probability measure that is applied to a metric, and the probability measure is restricted between zero and one with a finite and binary support. The interrupt mechanism meets the fast simulation needs of complex 6G communication systems, e.g., reconfigurable intelligent surface aided communication networks, space-air-ground integrated networks, and ultra-dense networks.

Figure 9:
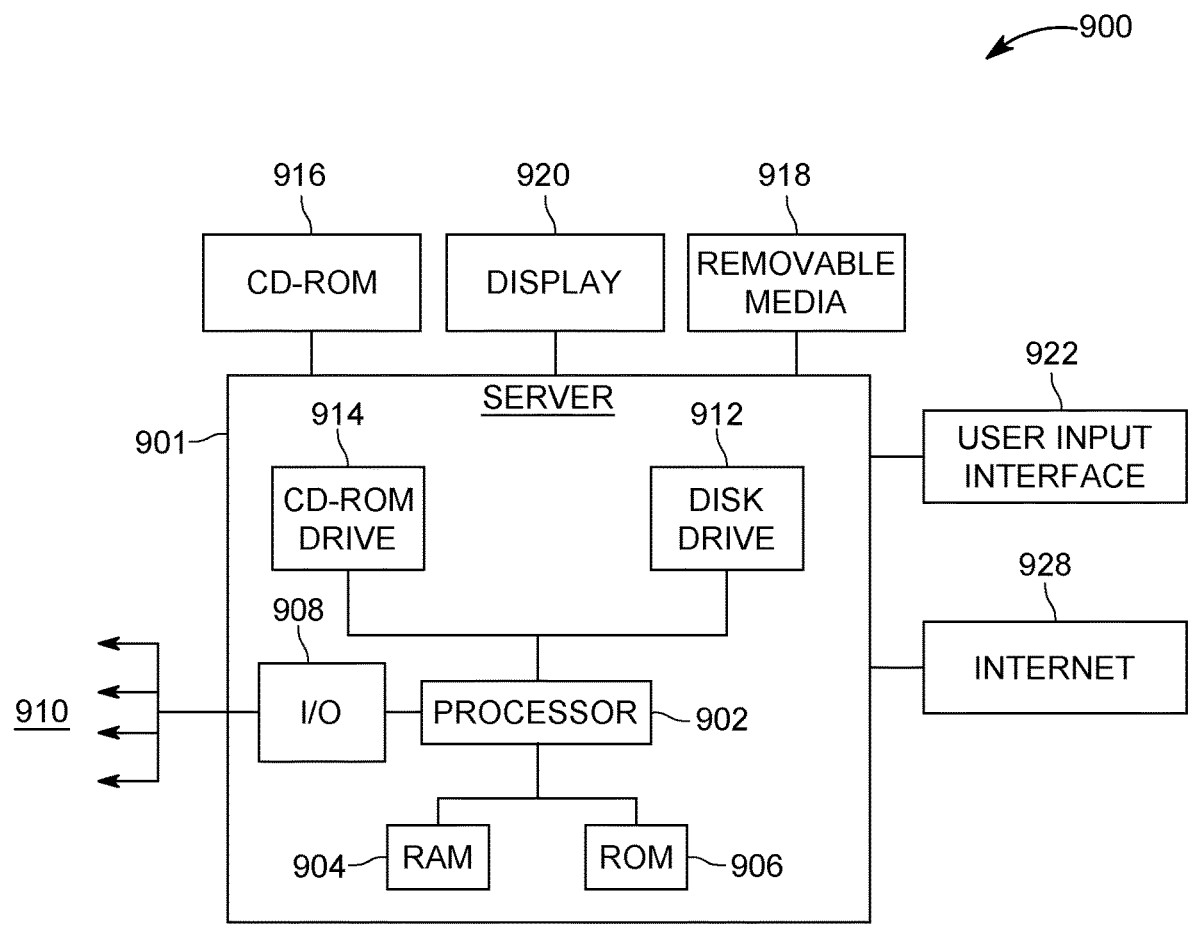
FIG. 9 schematically illustrates a logical configuration of the estimation module.

The above-discussed procedures and methods may be implemented in a computing device as illustrated in FIG. 9. Hardware, firmware, software or a combination thereof may be used to perform the various steps and operations described herein. Computing device 900 (which corresponds to module 630) of FIG. 9 is an exemplary computing structure that may be used in connection with such a system.

Exemplary computing device 900 suitable for performing the activities described in the exemplary embodiments may include a server 901. Such a server 901 may include a central processor (CPU) 902 coupled to a random access memory (RAM) 904 and to a read-only memory (ROM) 906. ROM 906 may also be other types of storage media to store programs, such as programmable ROM (PROM), erasable PROM (EPROM), etc. Processor 902 may communicate with other internal and external components through input/output (I/O) circuitry 908 and bussing 910 to provide control signals and the like. Processor 902 carries out a variety of functions as are known in the art, as dictated by software and/or firmware instructions.

Server 901 may also include one or more data storage devices, including hard drives 912, CD-ROM drives 914 and other hardware capable of reading and/or storing information, such as DVD, etc. In one embodiment, software for carrying out the above-discussed steps may be stored and distributed on a CD-ROM or DVD 916, a USB storage device 918 or other form of media capable of portably storing information. These storage media may be inserted into, and read by, devices such as CD-ROM drive 914, disk drive 912, etc. Server 901 may be coupled to a display 920, which may be any type of known display or presentation screen, such as LCD, plasma display, cathode ray tube (CRT), etc. A user input interface 922 is provided, including one or more user interface mechanisms such as a mouse, keyboard, microphone, touchpad, touch screen, voice-recognition system, etc.

Server 901 may be coupled to other devices, such as elements of a telecommunication system, a power plant, an electrical grid, a factory, a robotic system, etc. The server may be part of a larger network configuration as in a global area network (GAN) such as the Internet 928, which allows ultimate connection to various landline and/or mobile computing devices.

The disclosed embodiments provide an interrupt mechanism for estimating a probability measure of a power related metric in an engineer system having plural parts. It should be understood that this description is not intended to limit the invention. On the contrary, the embodiments are intended to cover alternatives, modifications and equivalents, which are included in the spirit and scope of the invention as defined by the appended claims. Further, in the detailed description of the embodiments, numerous specific details are set forth in order to provide a comprehensive understanding of the claimed invention. However, one skilled in the art would understand that various embodiments may be practiced without such specific details.

Although the features and elements of the present embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

REFERENCES

The entire content of all the publications listed herein is incorporated by reference in this patent application.

[1] M.-H. Hsieh, "Adaptive Monte Carlo methods for rare event simulations," in Proc. IEEE WSC, vol. 1, San Diego, USA, 2002, pp. 108-115.

What is claimed is:

1. A method for estimating a status of a system, the method comprising:
performing independent measurements on the system;
associating a value $P(\gamma)$ of a probability measure P, when applied to a power related metric $\gamma$, with a Monte Carlo calculated probability measure $P(\gamma)$, which depends on (1) a preset threshold $N_u$ of unfavorable events extracted from the measurements, and (2) a total number $\tilde{N}_{tot}(\gamma)$ of the independent measurements for collecting the preset threshold $N_u$ of the unfavorable events;
setting a threshold level $\eta$ uniquely associated with the system;
requiring that a critical value $\gamma_c$ of the power related metric $\gamma$ makes a value $P(\gamma_c)$ of the probability measure P to be substantially equal to the threshold level $\eta$;
comparing the total number $\tilde{N}_{tot}(\gamma)$ of independent measurements to a ratio of (1) a product of a control parameter E and the preset threshold $N_u$ of the unfavorable events, and (2) the threshold level $\eta$; and
interrupting the independent measurements performed on the system if the total number $\tilde{N}_{tot}(\gamma)$ is larger than the ratio, and increasing an output of the system if the total number $\tilde{N}_{tot}(\gamma)$ is smaller than or equal to the ratio,
wherein the system is a telecommunication system or a power system, and
wherein the output is a power of a signal for the telecommunication system or a generated power for the power system.

2. The method of claim 1, wherein the probability measure P is (1) a real valued measure restricted between zero and one, (2) monotone non-increasing with respect to the power related metric, and (3) represented as a logarithmic coordinate versus a linear span of the power related metric.

3. The method of claim 1, further comprising:
selecting the power related metric $\gamma$ to quantify a parameter of the system.

4. The method of claim 3, wherein the parameter represents the signal transmitted by the telecommunication system, the power related metric $\gamma$ is a signal to noise ratio, and the output is the power of the signal.

5. The method of claim 1, further comprising:
restricting the value $P(\gamma)$ of the probability measure P to be larger than the threshold level $\eta$.

6. The method of claim 1, wherein the Monte Carlo calculated probability measure $P(\gamma)$ is calculated using a Monte Carlo sampling.

7. The method of claim 1, wherein the status is an error or an outage of the system.

8. The method of claim 1, wherein the control parameter is equal to or larger than 1.

9. The method of claim 1, wherein the step of interrupting comprises:
avoid sampling with the Monte Carlo method a span of the power related metric $\gamma$, beyond the critical value $\gamma_c$.

10. A method for interrupting a Monte Carlo sampling while estimating a status of a system, the method comprising:
performing independent measurements of a power related metric $\gamma$ associated with the system;
calculating a Monte Carlo probability measure $P(\gamma)$, which depends on (1) a preset threshold $N_u$ of unfavorable events extracted from the independent measurements, and (2) a total number $\tilde{N}_{tot}(\gamma)$ of the independent measurements for collecting the preset threshold $N_u$ of the unfavorable events;
comparing the total number $\tilde{N}_{tot}(\gamma)$ of independent measurements to a ratio of (1) a product of a control parameter E and the preset threshold $N_u$ of the unfavorable events, and (2) a threshold level $\eta$; and interrupting the independent measurements performed on the system if the total number $\tilde{N}_{tot}(\gamma)$ is larger than the ratio, and increasing an output of the system if the total number $\tilde{N}_{tot}(\gamma)$ is smaller than or equal to the ratio, wherein the system is a telecommunication system or a power system, and wherein the output is a power of a signal for the telecommunication system or a generated power for the power system.

11. The method of claim 10, wherein the power related metric $\gamma$ estimates the signal transmitted by the system, the system is the telecommunication system, the output is the power of the signal, and the status is an error or an outage of the telecommunication system.

12. The method of claim 10, further comprising:

associating a value $P(\gamma)$ of a probability measure P, when applied to the power related metric $\gamma$, with the Monte Carlo calculated probability measure $P(\gamma)$;

requiring that a critical value $\gamma_c$ of the power related metric $\gamma$ makes a value $P(\gamma_c)$ of the probability measure P to be substantially equal to the threshold level $\eta$; and restricting the value $P(\gamma)$ of the probability measure P to be larger than the threshold level $\eta$.

13. An estimation module for estimating a status of a system, the estimation module comprising:

an interface configured to receive a power related metric $\gamma$ to quantify a parameter of the system; and a processor connected to the interface and configured to, perform independent measurements on the system;

associate a value $P(\gamma)$ of a probability measure P, when applied to a power related metric $\gamma$, with a Monte Carlo calculated probability measure $\tilde{N}_{tot}(\gamma)$, which depends on (1) a preset threshold $N_u$ of unfavorable events extracted from the measurements, and (2) a total number $\tilde{N}_{tot}(\gamma)$ of the independent measurements for collecting the preset threshold $N_u$ of the unfavorable events;

receive a threshold level $\eta$ uniquely associated with the system;

require that a critical value $\gamma_c$ of the power related metric $\gamma$ makes a value $P(\gamma_c)$ of the probability measure P to be substantially equal to the threshold level $\eta$;

compare the total number ($\gamma$) of independent measurements to a ratio of (1) a product of control parameter $\epsilon$ and the preset threshold $N_u$, of the unfavorable events, and (2) the threshold level $\eta$; and interrupt the independent measurements performed on the system if the total number $\tilde{N}_{tot}(\gamma)$ is larger than the ratio, and increasing an output of the system if the total number $\tilde{N}_{tot}(\gamma)$ is smaller than or equal to the ratio, wherein the system is a telecommunication system or a power system, and wherein the output is a power of a signal for the telecommunication system or a generated power for the power system.

14. The estimation module of claim 13, wherein the parameter represents the signal transmitted by the telecommunication system, the power related metric $\gamma$ is a signal to noise ratio, and the output is the power of the signal.

15. The estimation module of claim 13, wherein the processor is further configured to:

restrict the value $P(\gamma)$ of the probability measure P to be larger than the threshold level $\eta$.

16. The estimation module of claim 13, wherein the Monte Carlo calculated probability measure $P(\gamma)$ is calculated using a Monte Carlo sampling.

17. The estimation module of claim 13, wherein the status is an error or an outage of the system.

18. The estimation module of claim 13, wherein the control parameter is equal to or larger than 1.

19. The estimation module of claim 13, wherein the processor is further configured to:

skip sampling with the Monte Carlo method a span of the power related metric $\gamma$, beyond the critical value $\gamma_c$.

* * * * *